June 5, 1956 W. E. WITHALL 2,749,114
RUBBER CUSHIONING MEANS FOR SHOCK ABSORBERS
Filed March 13, 1952
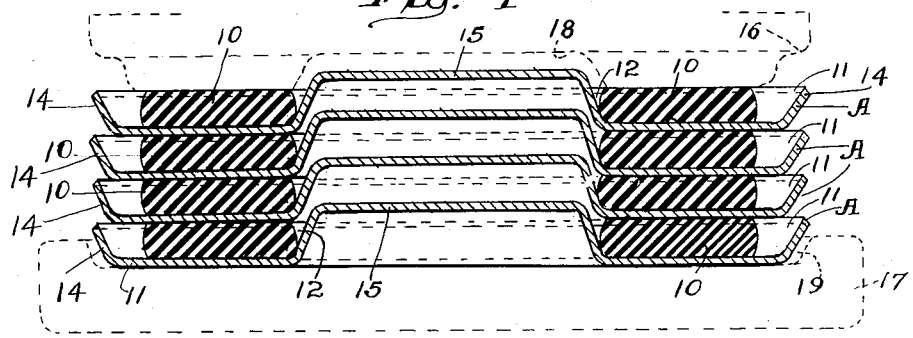
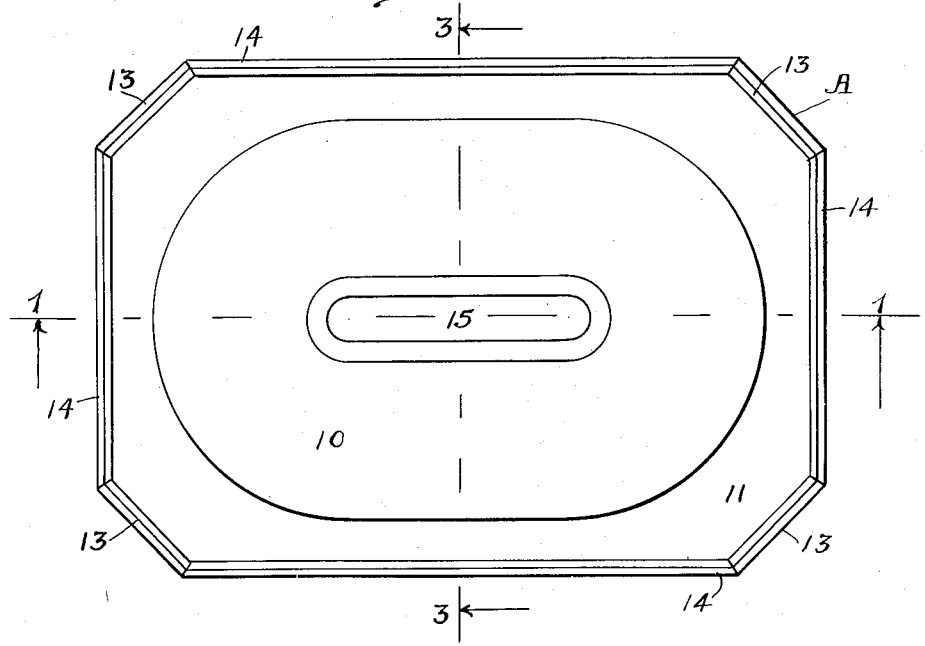
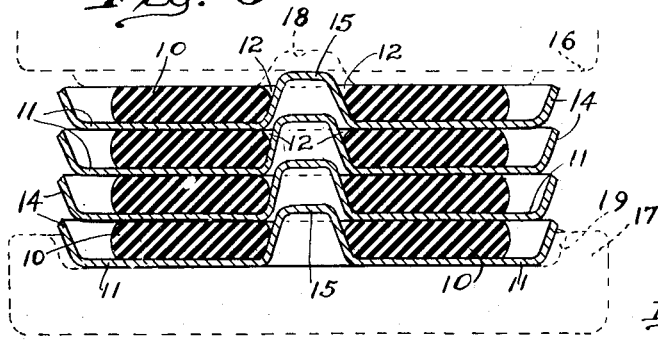
Inventor:
William E. Withall.
By Henry Fuchs
Atty.

United States Patent Office 2,749,114
Patented June 5, 1956

2,749,114

RUBBER CUSHIONING MEANS FOR SHOCK ABSORBERS

William E. Withall, Hinsdale, Ill., assignor to W. H. Miner, Inc., Chicago, Ill., a corporation of Delaware Application March 13, 1952, Serial No. 276,429

1 Claim. (Cl. 267—63)

This invention relates to improvements in means for cushioning shocks, and more particularly to cushioning units composed of rubber pads or mats alternated with metal spacing members or plates.

One object of the invention is to provide a cushioning unit comprising a plurality of rubber pads or mats, alternated with metal spacing members or plates, wherein each spacing member is of pan-shaped formation and has one of said rubber pads or mats seated therein, and wherein each spacing member is provided with a hollow bosslike centering projection extending through said rubber mat and into the hollow boss of the spacing member of the next adjacent mat to hold said mats and plates in aligned and centered relation.

Another object of the invention is to provide a rubber cushioning unit composed of a plurality of elements, each element of which comprises a pan-shaped metal spacing member having a peripheral flange, and a flat rubber mat or pad seated in said pan-shaped member, the rubber mat or pad being of smaller size in area than the pan-shaped spacing member to provide clearance for expansion of the same, and the pan-shaped member having a centrally disposed centering boss extending into a central opening provided in the mat to hold the latter centered within said pan-shaped member.

Other objects of the invention will more clearly appear from the description and claims hereinafter following.

In the accompanying drawing forming a part of this specification, Figure 1 is a vertical sectional view of my improved rubber cushioning unit, said figure illustrating in dotted lines top and bottom followers between which said unit is interposed, said section on line 1—1 of Figure 2. Figure 2 is a top plan view of Figure 1. Figure 3 is a transverse sectional view, corresponding substantially to the line 3—3 of Figure 2, said view illustrating in dotted lines top and bottom followers associated with said unit.

In carrying out my invention, I provide a rubber cushioning unit composed of a series of elements A—A, each element A comprising a flat rubber mat 10 and a pan-shaped metal member 11 in which the mat 10 is seated. As will be evident, the pan-shaped members 11 form, in effect, spacing plates which are alternated with the rubber mats of the unit.

The rubber mats 10 are of generally oval outline as shown most clearly in Figure 2. Each mat 10 is provided with an elongated central opening 12 extending therethrough, the longitudinal axis of which opening extends lengthwise of said mat.

The pan-shaped metal member 11 of each element A of the rubber cushioning unit is of substantially rectangular outline, as shown in Figure 2, and has its corners cut away or bevelled off, as indicated at 13. The main body portion of each member 11 is in the form of a flat plate. Each member 11 has an upstanding peripheral flange 14, which flares outwardly so that it may be telescoped within the flange of the member 11 of the adjacent element. Each member 11 is further provided with an upstanding hollow central boss 15, which is elongated lengthwise of the member 11 and is of a size to fit snugly within the opening 12 of the corresponding mat 10 to center the latter within said pan-shaped member. As clearly shown in Figures 1 and 3, the boss 15 of each member 11 extends upwardly beyond the corresponding pad and projects into the hollow boss 15 of the member 11 of the adjacent element of the rubber cushioning unit. The bosses 15 thus provide centering means for maintaining the members 11 of the rubber cushioning unit in alignment and the mats centered in said members. As hereinbefore pointed out, the bosses 15 closely fit the openings 12 of the mats 10, thus blocking inward flow of the material of the mat during compression thereof between the members 11—11, thereby compelling outward flow of said material with resulting increased shock absorbing capacity of the mat.

As shown, each rubber mat 10 is of considerably smaller size in area than the associated pan-shaped member 11, there being clearance all around the mat 10 between the same and the upstanding flange 14 of said member 11, thus providing ample space for flattening out of the pad without danger of the same being damaged by being squeezed too tightly against said flange.

In Figures 1 and 3, my improved rubber cushioning unit is shown as interposed between two relatively movable followers, which are shown in dotted lines, and are indicated respectively by 16 and 17. As shown, the follower 16 is recessed, as indicated at 18, to accommodate the boss 15 of the member 11 of the top element of my improved unit, and the follower 17 preferably has a seat 19 in which the member 11 of the bottommost element of said unit is accommodated.

The operation of my improved cushioning unit is as follows: During relative approach of the followers 16 and 17, the rubber mats 10 are compressed between the members 11 and flattened out, the material of each mat 10 flowing outwardly toward the peripheral flange of the associated member 11, thus absorbing the shock.

When the actuating force is reduced after compression of the cushioning unit, the tendency of the distorted rubber mats to return to their normal shape causes the cushioning unit to expand, thereby returning the parts to the full release position shown in Figures 1 and 3.

I claim:

In a cushioning unit for a shock absorbing mechanism, the combination with a series of rubber mats each having a central opening therethrough; of a series of spacing plates alternated with said mats; flanges on said plates extending obliquely outwardly from the edges thereof and disposed outwardly from the edges of said mats to provide spaces into which the mats are displaced as the unit is compressed; and a hollow, tapered centering projection on each plate fitting in and extending through the opening in the corresponding mat to hold the mat centered with respect to the plate, the centering projection on each plate projecting into the hollow portion of the centering projection of the adjacent plate in the series and the flanges on each plate projecting over the flanges on the adjacent plate in the series as the unit is compressed thereby to maintain the unit in alignment.

References Cited in the file of this patent

UNITED STATES PATENTS

| 107,034 | Gardiner | Sept. 6, 1870 |
| 1,871,376 | Keys | Aug. 9, 1932 |
| 2,117,264 | Workman | May 10, 1938 |
| 2,573,108 | Piron | Oct. 30, 1951 |
| 2,598,762 | Dath | June 3, 1952 |

FOREIGN PATENTS

| 446 | Italy | Sept. 30, 1857 |